United States Patent
Dion (10) Patent No.: US 9,810,032 B2
(45) Date of Patent: *Nov. 7, 2017

(54) CABLE SPOOLS WITH SHEAVES

(71) Applicant: PATCO Machine & Fab., Inc., Houston, TX (US)

(72) Inventor: Dennis Dion, Spring, TX (US)

(73) Assignee: PATCO Machine & Fab., Inc., Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 14/945,195

(22) Filed: Nov. 18, 2015

(65) Prior Publication Data

US 2017/0016287 A1 Jan. 19, 2017

Related U.S. Application Data

(63) Continuation of application No. 14/802,814, filed on Jul. 17, 2015, now Pat. No. 9,206,658.

(51) Int. Cl.
*E21B 19/22* (2006.01)
*B65H 75/44* (2006.01)
(Continued)

(52) U.S. Cl.
CPC ............ *E21B 19/22* (2013.01); *B65H 75/38* (2013.01); *B65H 75/4489* (2013.01);
(Continued)

(58) Field of Classification Search
CPC ............ B65H 2551/10; B65H 2557/11; B65H 2701/33; B65H 2701/34; B65H 75/38; B65H 75/4489; E21B 19/22; E21B 33/064
See application file for complete search history.

(56) References Cited

U.S. PATENT DOCUMENTS 2,490,353 A * 12/1949 Hannay ................. B65H 75/38
137/355.27
2,548,616 A 4/1951 Priestman et al.
(Continued)

FOREIGN PATENT DOCUMENTS

BE 1006560 A6 10/1994
CN 201934087 U 8/2011
(Continued)

OTHER PUBLICATIONS

Notification of Transmittal of the International Search Report and Written Opinion dated Sep. 22, 2016, issued in International Application No. PCT/US2016/036323 (10 pages).
(Continued)

*Primary Examiner* — James G Sayre
(74) *Attorney, Agent, or Firm* — Beem Patent Law Firm (57) ABSTRACT

A spooling system for deploying cable, hose, and/or umbilical connections may include a drum, an air motor, a sheave having one or more sensor, and an electronic control unit coupled to an electro-pneumatic drive for controlling the system. The sensors may provide information to the electronic control unit, such as a measured line tension and/or a length of cable, hose or umbilical connection that has been deployed, and the information may be displayed on the electronic control unit. The electronic control unit also may allow an operator to rotate the reel, stop rotation of the reel, increase or decrease the speed of rotation of the reel, increase or decrease pressure and/or line tension, and/or select between a normal mode of operation and a tensioning mode of operation.

20 Claims, 9 Drawing Sheets

(51) Int. Cl.
  *G05B 15/02* (2006.01)
  *E21B 33/064* (2006.01)
  *B65H 75/38* (2006.01)
(52) U.S. Cl.
  CPC ............ *E21B 33/064* (2013.01); *G05B 15/02* (2013.01); *B65H 2551/10* (2013.01); *B65H 2557/11* (2013.01); *B65H 2701/33* (2013.01); *B65H 2701/34* (2013.01)

(56) References Cited

U.S. PATENT DOCUMENTS

| | | | |
|---|---|---|---|
| 3,190,307 | A | 6/1965 | de Vries |
| 3,313,346 | A | 4/1967 | Cross |
| 3,481,584 | A | 12/1969 | Robertson |
| 4,475,163 | A | 10/1984 | Chandler |
| 5,176,364 | A | 1/1993 | Bell |
| 5,373,925 | A | 12/1994 | Handford |
| 5,950,953 | A | 9/1999 | Baugh et al. |
| 6,216,789 | B1 | 4/2001 | Lorsignol |
| 6,932,325 | B1 | 8/2005 | Selcer et al. |
| 7,210,647 | B2 | 5/2007 | Dion |
| 7,363,968 | B1 | 4/2008 | Baugh |
| 7,967,234 | B2 | 6/2011 | Baugh |
| 8,061,644 | B1 | 11/2011 | Dion |
| 8,352,210 | B2 | 1/2013 | Kranz |
| 8,733,433 | B2 * | 5/2014 | Coles ............ E21B 19/22 166/77.1 |
| 8,763,709 | B2 | 7/2014 | Shampine |
| 8,820,399 | B2 | 9/2014 | Witte et al. |
| 9,206,658 | B1 * | 12/2015 | Dion ............ E21B 19/22 |
| 2003/0006034 | A1 * | 1/2003 | Neal ............ B65H 75/4402 166/77.2 |
| 2003/0071160 | A1 * | 4/2003 | Cain ............ B65H 75/14 242/390.5 |
| 2006/0000936 | A1 | 1/2006 | Caamano et al. |
| 2006/0273213 | A1 * | 12/2006 | Turk ............ B65H 75/425 242/397.3 |
| 2007/0152093 | A1 | 7/2007 | Hartzheim |
| 2011/0006149 | A1 | 1/2011 | Baugh |
| 2011/0006150 | A1 | 1/2011 | Baugh |
| 2011/0198431 | A1 | 8/2011 | Baugh |
| 2012/0267466 | A1 | 10/2012 | Tracey et al. |
| 2013/0161441 | A1 | 6/2013 | Bjornenak et al. |
| 2014/0216735 | A1 | 8/2014 | Bell et al. |
| 2014/0224917 | A1 * | 8/2014 | Turner ............ B65H 75/446 242/400 |
| 2015/0083843 | A1 | 3/2015 | Rekieta et al. |
| 2016/0311634 | A1 * | 10/2016 | Rekieta ............ B65G 67/606 |
| 2016/0362945 | A1 | 12/2016 | Baugh |
| 2016/0362946 | A1 | 12/2016 | Baugh |
| 2016/0362947 | A1 | 12/2016 | Baugh |
| 2016/0362948 | A1 | 12/2016 | Baugh |

FOREIGN PATENT DOCUMENTS

| | | |
|---|---|---|
| CN | 102756952 A | 10/2012 |
| GB | 816845 A | 7/1959 |
| KR | 20120138357 A | 12/2012 |
| WO | 2009032601 A1 | 3/2009 |
| WO | 2012034460 A1 | 3/2012 |
| WO | 2016200437 | 12/2016 |

OTHER PUBLICATIONS

Red Rooster Industrial (UK) Ltd, Hosereel/Umbilical/Transponder Winches, http://www.swlrooster.co.uk/poweredwinches_transponder.htm, last accessed Jul. 13, 2015.
Red Rooster Industrial (UK) Ltd, Offshore Air Winches 0AW/0MR Series, http://www.swlrooster.co.uk/poweredwinches_offshoreair.htm, last accessed Jul. 13, 2015.
Ingersol Rand, Winches and High Capacity Hoists, http://www.ingersollrandproducts.com/lifting/AirWinch%20Catalog.pdf, last accessed Jul. 13, 2015.
PATCO Machine & Fab., Inc., Equipment, http://www.patcomachandfab.com/equipment.html, last accessed Jul. 17, 2015.
PATCO Machine & Fab., Inc., Products, http://www.patcomachandfab.com/product.html, last accessed Jul. 17, 2015.
Dion, Dennis, "42054-R0_Sht_1_Control_Panel_Assembly", dated Apr. 18, 2006.
Dion, Dennis, "42051-R4_Pneumatic_Schematic", dated Oct. 20, 2005, with various subsequent revisions.
Dion, Dennis, "42050-R7_General_Assembly", dated Sep. 14, 2005, with various subsequent revisions.

* cited by examiner

CABLE SPOOLS WITH SHEAVES

This application is a continuation of and claims benefit of priority from U.S. patent application Ser. No. 14/802,814 filed Jul. 17, 2015, which is incorporated by reference in its entirety.

BACKGROUND OF THE INVENTION

1. Technical Field

The present application relates to reel systems for the receiving, storage, and deploying of cables (such as one or more electrical lines), hoses, umbilical connections (such as bundles of hydraulic lines, electrical lines, cables, hoses, and/or combinations thereof) and the like.

2. Related Art

Subsea blowout prevention equipment (BOP) uses large, specialized valves or similar mechanical devices, usually installed redundantly in stacks, to seal, control and monitor oil and gas wells. Redundant sub-sea control pods are used to control the valves of the BOP stack, some of which are referred to in the industry as blue and yellow pods. The pods of the BOP stack are controlled by cables, hoses, umbilical connections and the like with various capacity outside diameters. The reel systems used for winding the cable, hoses, umbilical connections and the like onto spools, particularly on off-shore drill rigs, employ spools which are mechanically driven.

Off-shore drill rigs often use multiplex cable reels, hot line hose reels, riser fill valve hose reels and the like in control systems for BOP equipment. Each of these components may provide various functionalities. In a typical rig, four spools may provide control cables for a BOP stack. These components may function as follows: multiplex cable reel assemblies may be used to pay out and retrieve multiplex cables that may be used to transmit electric signals to allow for the control of sub-sea hydraulic functions on the sub-sea blue and yellow pods; a hot line hose reel assembly may be used to pay out and retrieve a hose that provides hydraulic fluid from the drilling rig deck to the sub-sea pods to allow for the control of sub-sea hydraulic functions on the sub-sea blue and yellow pods; and a riser fill valve hose reel assembly may pay out and retrieve a hose that provides, in response to a sudden pressure differential between the inside and outside of a riser opens to allow the riser to fill with seawater and thus equalizing the pressure differential and preventing collapse of the riser.

In operation, the spools are typically located on the drillship near a moon pool area (i.e. the opening in the floor or base of the platform to provide access to the water below) and may be on different levels depending on the rig design. The cable or hose often is deployed from the spool to an overhead roller type turn down sheave, or multiple sheaves, to direct the cable or hose to the blue and yellow pods on the BOP stack assembly in the drill ship's moon pool.

Typical systems employ manual, pneumatically-controlled, mechanical control systems for each of the individual reel assemblies, to position the sub-sea end of the cable or hose to the pod. Once the cables and hoses are connected to the pods, the operation of deploying the BOP stack begins. Drill pipe and flotation risers having typical lengths of 60 to 90 feet or more (nominally, about 18 to 28 meters) are attached to the stack. The cables and hoses are attached to clamps located on the riser as the 60 or 90 foot (nominally, about 18 to 28 meters) sections are made up. The reels are not rotating while the drill pipe and riser sections are made up. Once made up, the reels begin rotating to deploy the cables and hoses until the next section is ready to be attached. This operation continues until the BOP stack is anchored to the sea bed floor. A control stand may be located away from the spools, in the moon pool area, with a clear vision of the deployment. The operator at the remote control stand may be able to operate one or more of the reel assemblies and may make adjustments as may be necessary during the operation.

Currently, the pneumatically driven mechanical control systems used to control the reel assembly operation suffer from various shortcomings. For example, there are limitations on the locations of reel assemblies and a remote control stand because pneumatic control signals are subject to decreasing performance such as slower responses as the distance between the reel and the remote control stand increases. As another example, mechanical push-pull valves are used to alternate control between a local controller and a remote control stand. The use of these valves necessitate that an operator manually activate the valve at each reel assembly to provide full control of the system to the remote control stand. In addition, current reel assemblies do not provide much feedback to the operator about the actual conditions of the cable/hose, such as accurate information about the actual tension on the cable/hose or how much of the cable/hose has been deployed.

Accordingly, a need has long existed for improved systems and methods for controlling cable spooling systems.

SUMMARY

In one aspect, a reel assembly for accepting, holding, and deploying cable, hose, umbilical connections or the like, may include a spool assembly including a frame and a drum mounted in said frame. The drum may include a core and end flanges for storing said cable, hose or umbilical connection. The reel assembly may also include an air motor, a sheave coupled to one or more sensors, and an electro-pneumatic drive unit including a plurality of pneumatic valves, electro-pneumatic valves, or both, and the air motor may be coupled to the drum via the electro-pneumatic drive unit. The reel assembly may also include an electronic control unit coupled to the electro-pneumatic drive unit and the one or more sensors. The electronic control unit may receive user input and may transmit electrical signals to the electro-pneumatic drive unit to cause the electro-pneumatic drive unit to control the motor to rotate the drum.

In another aspect, a reel assembly for accepting, holding, and deploying cable, hose, umbilical connections or the like, may include a spool assembly including a frame and a drum mounted in said frame, and the drum may include a core and end flanges for storing said cable, hose or umbilical connection. The reel assembly may also include an air motor and an electro-pneumatic drive unit including a plurality of pneumatic valves, electro-pneumatic valves, or both, and the air motor may be coupled to the drum via the electro-pneumatic drive unit. The reel assembly also may include a sheave coupled to one or more sensors that determine either a force applied to the sheave, a length of cable, hose or umbilical connection deployed, or both. The reel assembly may also include a local electronic control unit coupled to the electro-pneumatic drive unit and the one or more sensors, and the local electronic control unit may receive user input and may transmit electrical signals to the electro-pneumatic drive unit to cause the electro-pneumatic drive unit to control the motor to rotate the drum. The reel assembly may also include a remote electronic control unit coupled to the electro-pneumatic drive unit, and the remote electronic control unit may receive user input and may transmit electrical signals to the electro-pneumatic drive unit to cause the electro-pneumatic drive unit to control the motor to rotate the drum.

In yet another aspect, a system for deploying a blow out prevention (BOP) stack may include a plurality of reel assemblies for accepting, holding, and deploying cable, hose, umbilical connections or the like. Each reel assembly may include a spool assembly including a frame and a drum mounted in said frame, and the drum may include a core and end flanges for storing said cable, hose or umbilical connection. Each reel assembly may also include an air motor, a sheave couples to one or more sensors that determine either a force applied to the sheave, a length of cable, a hose or umbilical connection deployed, or both, and an electro-pneumatic drive unit including a plurality of pneumatic valves, electro-pneumatic valves, or both, and the air motor may be coupled to the drum via the electro-pneumatic drive unit. Each reel assembly may also include a local electronic control unit coupled to the electro-pneumatic drive unit and the one or more sensors, and the local electronic control unit may receive user input and may transmit electrical signals to the electro-pneumatic drive unit to cause the electro-pneumatic drive unit to control the motor to rotate the drum. The system may also include a remote electronic control unit coupled to the electro-pneumatic drive unit of each of the plurality of reel assemblies, and the remote electronic control may provide user interface controls for controlling each of the plurality of reel assemblies, may receive user input for controlling a selected reel assembly and, in response, may transmit electrical signals to the electro-pneumatic drive units of the selected reel assembly to cause the electro-pneumatic drive unit of the selected reel assembly to control the motor of the selected reel assembly to rotate the drum of the selected reel assembly.

In another aspect, a reel assembly may include a local electronic control unit and a remote electronic control unit. Selection of a user interface control on the remote electronic control unit may cause the local electronic control unit to display indicia indicative of at least one selected from the group of the user's selection on the remote electronic control unit user interface control and a current mode of operation.

In still another aspect, a reel assembly may include a local electronic control unit and a remote electronic control unit. Selection of a user interface control on the local electronic control unit may cause the remote electronic control unit to display indicia indicative of at least one selected from the group of the user's selection on the local electronic control unit user interface control and a current mode of operation.

In other various aspects, a reel assembly may include a sheave coupled to one or more sensors that determine either a force applied to the sheave, a length of cable, hose or umbilical connection deployed, or both. The sensors may be, for example, a load cell or a position sensor. The sheave may be coupled to an electronic control unit of the reel assembly, and the electronic control unit may receive information indicative of either the determined force, the length of cable, hose or umbilical connection deployed, or both. The electronic control also may display either a line tension value, a deployed cable value, or both, based on the received information.

Other systems, methods, features and technical advantages of the invention will be, or will become apparent to one with skill in the art, upon examination of the figures and detailed description. It is intended that all such additional systems, methods, features and technical advantages be included within this summary and be protected by the claims.

BRIEF DESCRIPTION OF THE DRAWINGS

The invention can be better understood with reference to the following drawings and description. The components in the figures are not necessarily to scale, emphasis instead being placed upon illustrating the principles of the invention.

DETAILED DESCRIPTION OF THE PREFERRED EMBODIMENTS

The elements illustrated in the figures interoperate as explained in more detail below. Before setting forth the detailed explanation, however, it is noted that all of the discussion below, regardless of the particular implementation being described, is exemplary in nature, rather than limiting.

Figure 1:
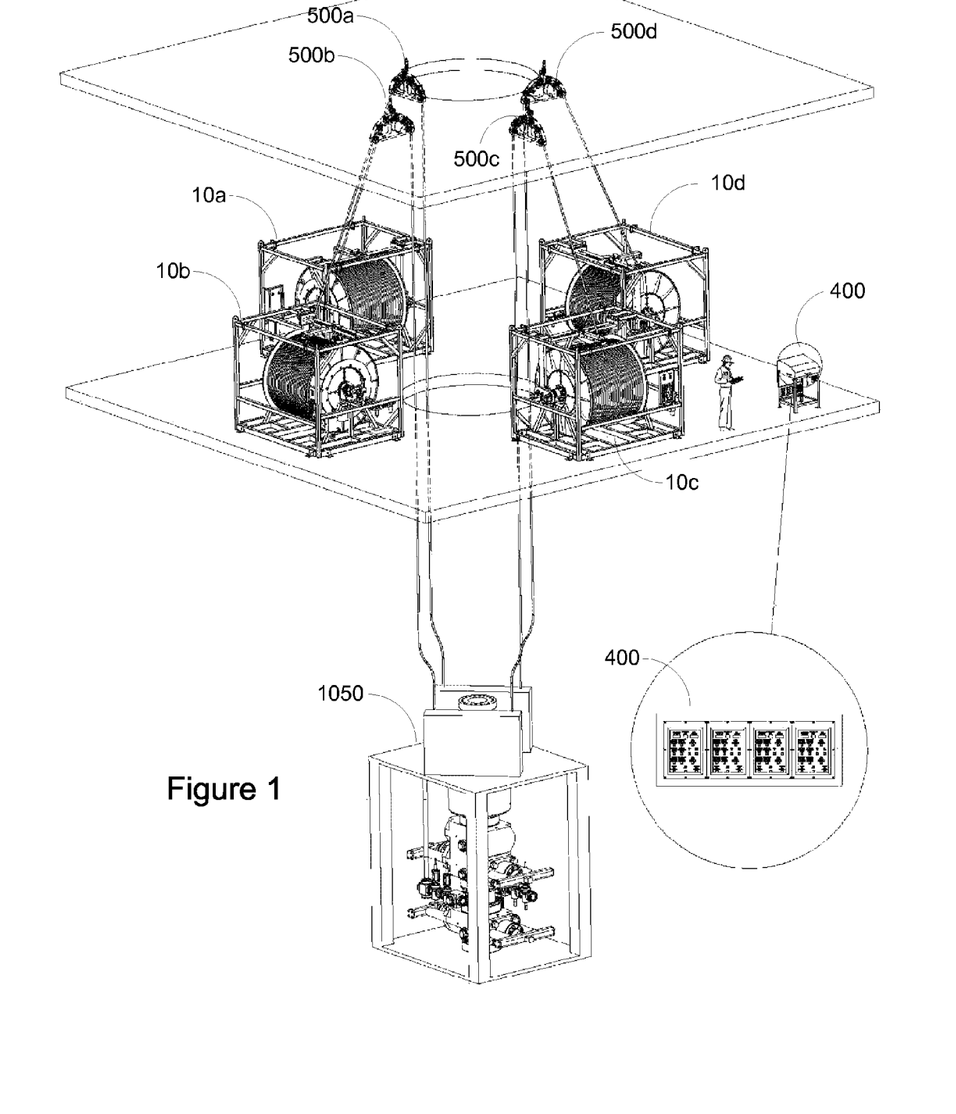
FIG. 1 shows an exemplary configuration of reel assemblies having electronic control systems on a drilling rig.

Referring to FIG. 1, an exemplary configuration of cable/hose reel assemblies 10*a-d* is shown. Although the terms "cable," "hose," "umbilical," and "cable/hose" are used to describe various aspects of the embodiments described herein, it should be understood by one of ordinary skill in the art that the embodiments may be used in combination with cables, hoses, umbilical connections and the like and that use of the terms is exemplary in nature and not limiting. As illustrated, the configuration includes four reel assemblies 10*a-d* operating in conjunction with associated turn-down sheaves 500*a-d* to provide various cables, hoses and the like to a BOP stack. Each reel assembly 10*a-d* may include an electronic local control unit 300 and may also be connected to an electronic remote control unit 400.

The cable/hose reel assembly 10 is shown generally in FIGS. 2-6, and may comprise a spool assembly 11 powered by an electro-pneumatic drive system 200 operated via an electronic control unit 300. In some embodiments, the assembly 10 may include a plurality of electronic control units 300, such as one or more local control units housed on the reel assembly 10 and one or more remote control units that may be physically separate from the reel assembly 10.

Figure 2:
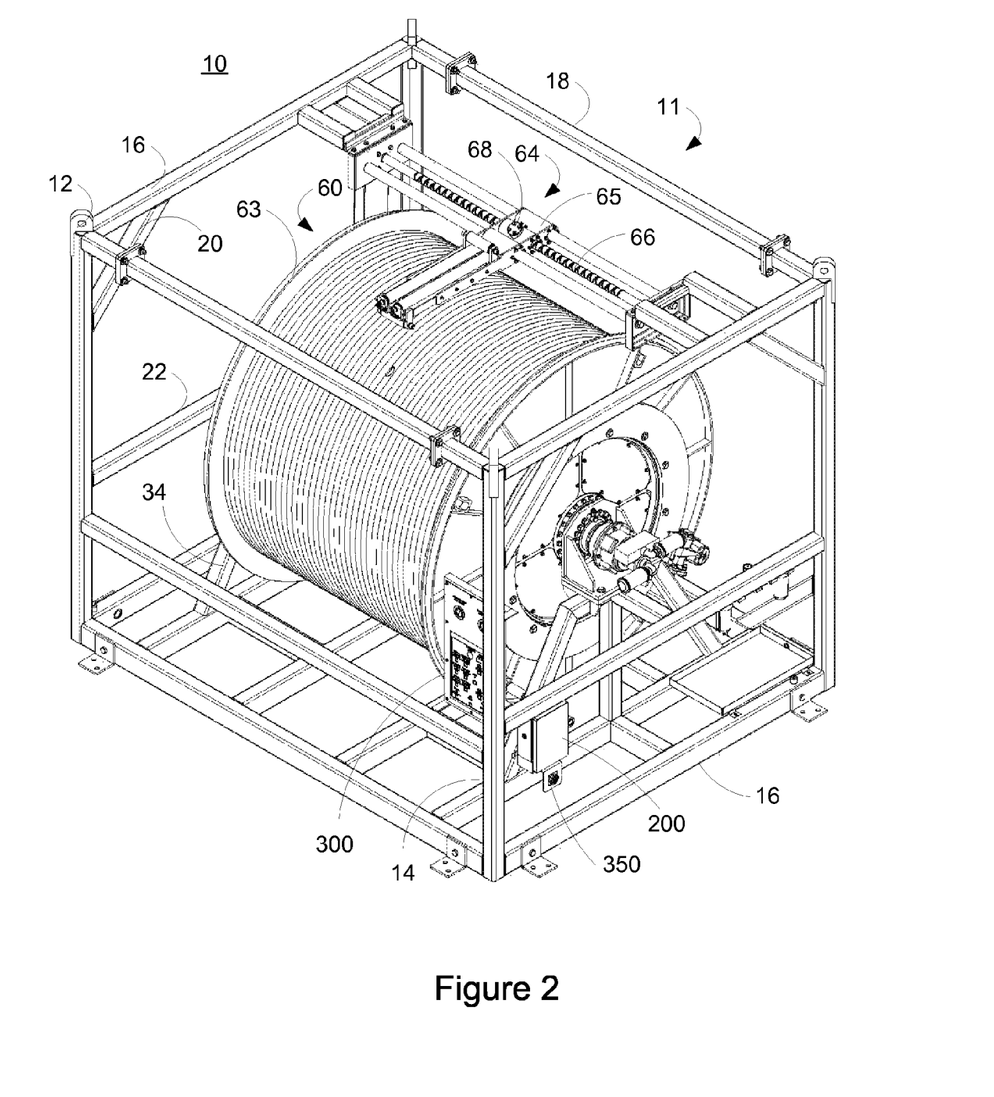
FIG. 2 shows a perspective view of an exemplary cable/hose reel assembly having an electronic control/hose reel assembly of FIG. 2.
Figure 3:
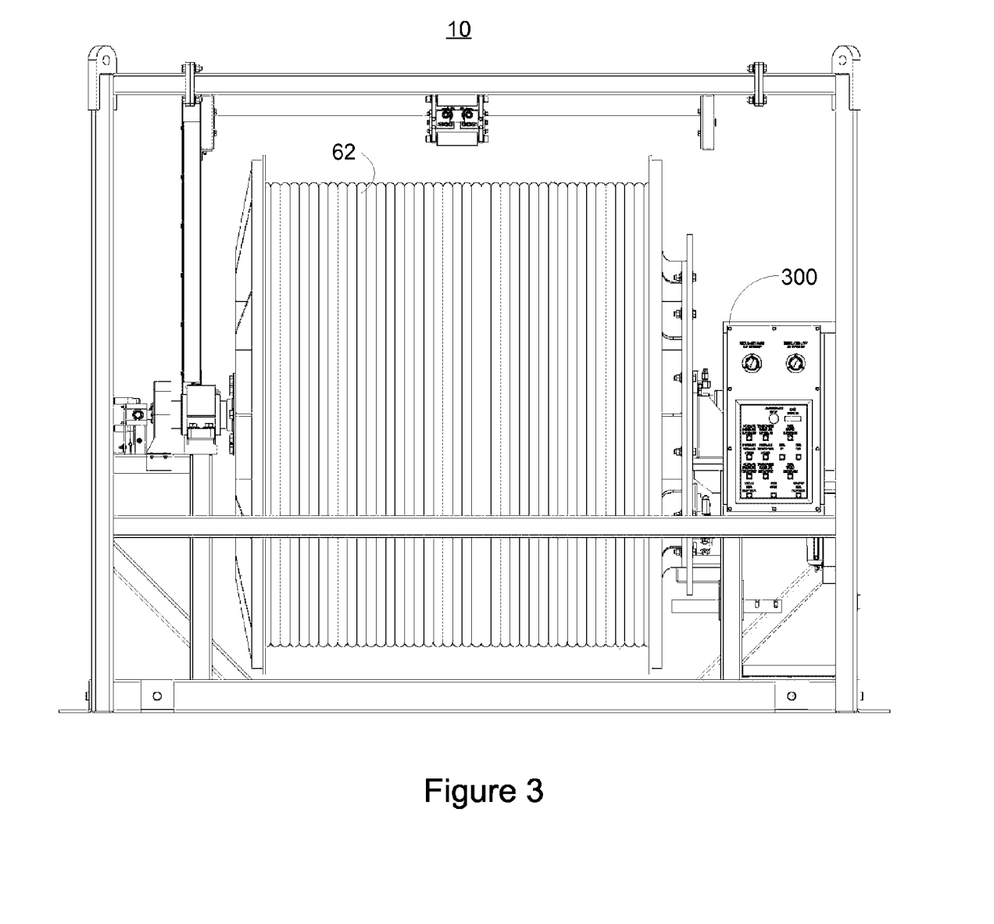
FIG. 3 shows a front view of the cable/hose reel assembly of FIG. 2.
Figure 4:
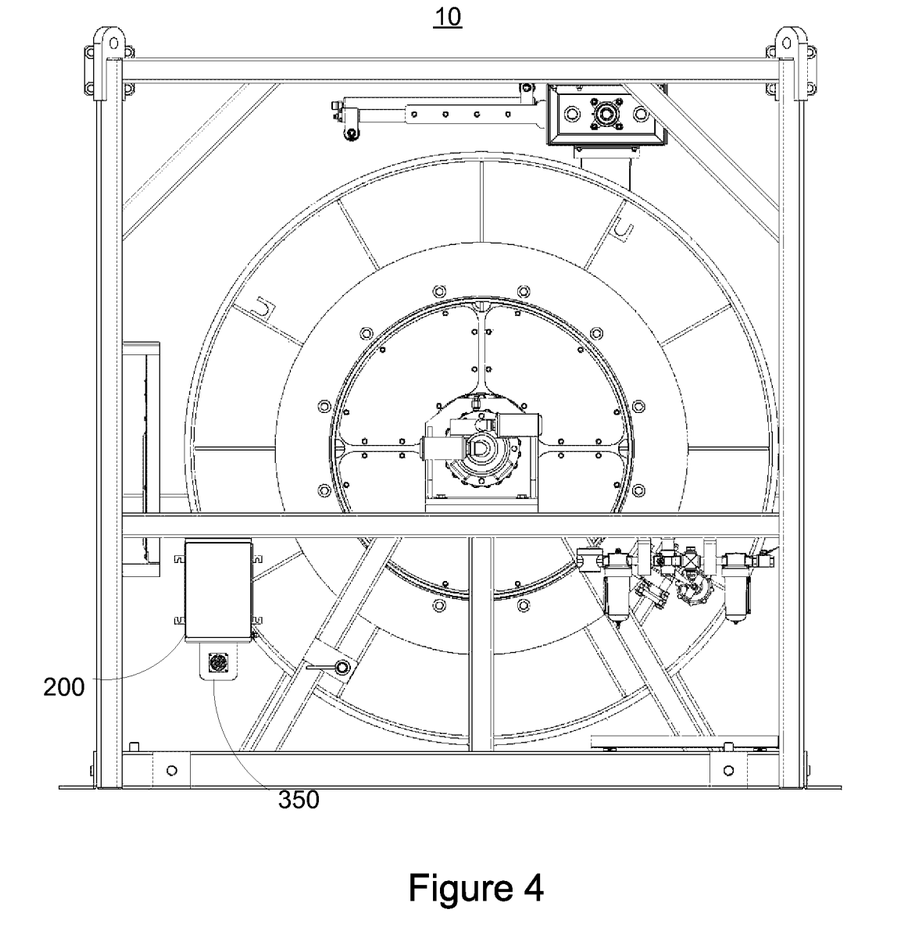
FIG. 4 shows a right side view of the cable reel assembly of FIG. 2.

The reel assembly 10 may comprise a frame 12 that rotatably supports a cable spool 60 via drum supporting members 34, the spool 60 having a core or hub 62 and opposite end flanges 63. A cable, wire, hose, etc. is guided onto and off of the spool for even wrapping by means of a guide or "level wind" assembly 64 having a carriage 65 mounted for traversing a reversible diamond groove shaft 66 by means of a follower 68, as the shaft 66 is rotated. In some embodiments, the "level wind" assembly 64 may operate like one or more of the ones described in U.S. Pat. Nos. 7,210,647 and 8,061,644, each of which is incorporated by reference as if fully restated herein. Other "level wind" assemblies may be used.

Spool 60 may have a diameter between about 30 inches (nominally, about 75 centimeters) and about 120 inches (nominally, about 30 centimeters) or more, preferably between about 48 inches (nominally, about 120 centimeters) and about 72 inches (nominally, about 185 centimeters), and may have a width between about 50 inches (nominally, about 125 centimeters) and about 150 inches, and preferably between about 72 inches and about 120 inches (nominally, about 300 centimeters). The flanges 63 may have a diameter between about 48 inches (nominally, about 120 centimeters) and about 205 inches (nominally, about 525 centimeters), preferably between about 60 (nominally, about 150 centimeters) inches and about 180 inches (nominally, about 460 centimeters). The cable/hose may have a length between about 4,000 feet (nominally, about 1,200 meters) and about 20,000 feet (nominally, about 6,100 meters), preferably between about 7,000 feet (nominally, about 2,100 meters) and about 15,0000 feet (nominally, about 4,600 meters) and even more preferably between about 11,000 feet (nominally, about 3,300 meters) and about 13,000 feet (nominally, about 4,000 meters). An exemplary cable may have a diameter between about ½ of an inch (nominally, about 1.2 centimeters) and about 2½ inches (nominally, about 6 centimeters), and typically about between about 1¼ inches (nominally, about 3.5 centimeters) and about 1¾ (nominally, about 4.5 centimeters). An exemplary hose may have a diameter between about 1½ inches (nominally, about 3.8 centimeters) and about 2½ inches (nominally, about 6 centimeters), and an exemplary umbilical connection may have a diameter between about 4 inches (nominally, about 10 centimeters) and about 8 inches (nominally, about 20 centimeters). Other sizes may also be used.

Frame 12 may include a plurality of vertical end frame members 14, horizontal end frame members 16, and cross members 18. Frame 12 also may include a plurality of corner braces 20, such as braces 20 connecting vertical end members 14 to horizontal end members 16 or to cross members 18.

Frame 12 further may include one or more intermediate, horizontal braces 22, preferably a plurality of braces 22, around a perimeter of frame 12. Horizontal braces 22 may be located proximate a height of the center/axis of rotation of spool 60, preferably slightly below center of spool 60.

The electronic control system 300 may receive input from an operator to control various aspects of the operation of the reel 11. In some embodiments, the electronic control system 300 may include a programmable logic controller (PLC) coupled to a touchscreen for displaying various interface controls, receiving user input and displaying status information to an operator. The PLC may be programmed to provide electrical signals to the electro-pneumatic drive unit 200 to control the operation of the reel assembly as described below. Other electronic input devices, such as keyboards, keypads, and the like may be used. Similarly, other components may be used to process the received inputs and provide control signals to the electro-pneumatic drive unit 200, such as a stand-alone computer, and/or to display status information to the operator, such as displays, LEDs and the like. The electronic control system 300 may be local control system that is fixedly and/or removably attached to the frame 12.

Figure 5:
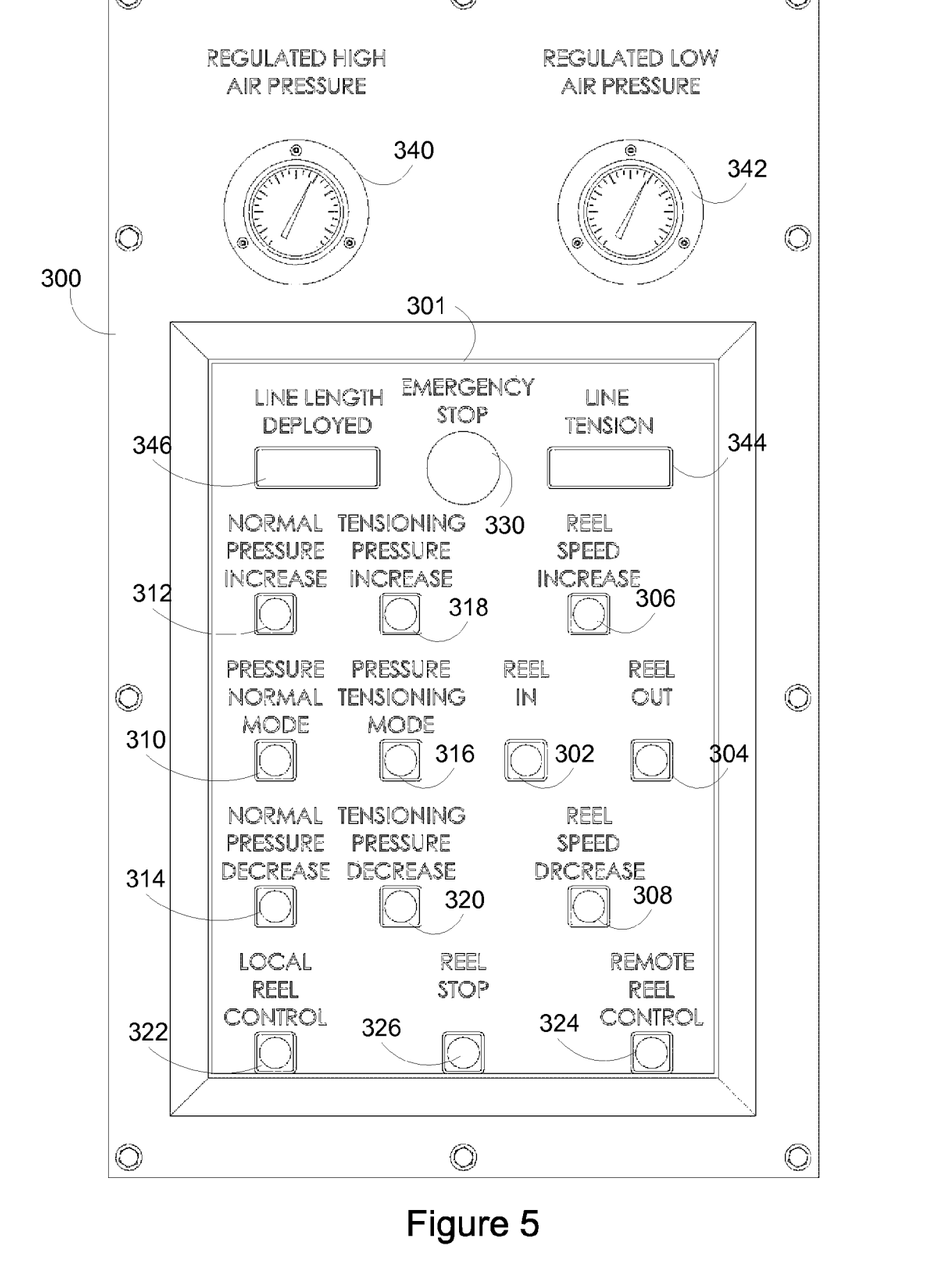
FIG. 5 shows an exemplary local control panel for the cable/hose reel assembly of FIG. 2.

Referring to FIG. 5, an exemplary local control unit 300 is shown. In the illustrated embodiment, the local control unit 300 includes a touchscreen device 301 for displaying various interface controls 302-330, receiving user input via the interface controls 302-330 and displaying status information to an operator. For example, the local control unit 300 may display a line tension value 344 and/or a length of cable deployed 346 that may be measured by sensors, such as a load cell or a position sensor, mounted in a turn down sheave that receives the cable mounted on the reel assembly 11, as described below. The local control unit 300 also may display indicia that indicates the selection of a user interface control 302-330. For example, upon selection of a "reel-in" control 302, the local control unit 300 may modify the color of the "reel-in" control 302 to indicate its selection by the user and/or to indicate that the reel is winding the cable, as described below. Alternatively, or additionally, other indicia, such as adding display items, removing displayed items, and the like, may be used to indicate the selection of a particular control 302-330.

In some embodiments, the local control unit 300 may also include pneumatic pressure gauges 340 and 342 may be provided to indicate the various system pressure settings. For example, a first pneumatic pressure gauge 340 may indicate the pneumatic pressure in a normal mode of operation and a second pneumatic pressure gage 342 may indicate the pneumatic pressure in a tensioning mode of operation, as described below.

In one embodiment, the operation of the reel assembly 11 via the local control unit 300 may be as follows. To reel up a cable, an operator may select the "reel in" interface control 302, which activates the corresponding solenoid valve 80 which in turn causes the drive motor 100 to rotate. The motor 100 can be reversed by selecting the "reel out" interface control 304, to reverse spool rotation for continuously and evenly feeding out cable. The speed at which the spool rotates may be adjusted by selecting the "reel speed increase" interface control 306 or "reel speed decrease" interface control 308 to increase or decrease the rotational speed of the spool, respectively. Selection of the "reel stop" interface control 326 may cause rotation of the spool to be halted. Selection of the "emergency stop" interface control 330 may cut-off power to the entire electro-pneumatic drive system 200, and selecting the "emergency stop" interface control again may reactivate the electro-pneumatic drive system 200. Alternatively, or additionally, one or more additional controls may be provided to reactivate the electro-pneumatic drive system 200. In some embodiments, previously established settings, such as a tension setting for a "normal" mode of operation and/or a "tensioning" mode of operation, may be saved when the "emergency stop" interface control 300 is activated. In other embodiments, one or more settings may be reset by depression of the "emergency stop" interface control 330.

An operator may switch between a "normal" mode of operation and a "tensioning" mode of operation by selecting the "normal pressure mode" interface control 310 or "pressure tensioning mode" interface control 316. The operator may increase or decrease the amount of tension in each of these modes independently via interface controls 312 and 314 for the "normal" mode and interface controls 318 and 320 for the "tensioning" mode.

The "normal" mode of operation may be used, for example, to spool a cable, hose or the like onto a reel during setup. In a "normal" mode of operation, a static pressure may be applied to the line, such as between about 10 pounds per square inch (PSI) (nominally, about 70 kiloPascals (kPa)) and about 145 PSI (nominally, about 1000 kPa), preferably between about 30 PSI (nominally, about 200 kPa) and about 110 PSI (nominally, about 760 kPa), more preferably between about 50 PSI (nominally, about 340 kPa) and about 90 PSI (nominally, about 620 kPa), and in one embodiment about 70-80 PSI (nominally, between about 480 kPa and about 550 kPa). The pressure may be selected to generate a predetermined cable/hose line tension for the reel assembly 10. In the "normal" mode of operation, selection of the "reel in" and/or "reel-out" controls 302 and 304 cause the assembly 10 to wind in or pay out the cable or hose.

In a "tensioning" mode of operation, the assembly 10 may maintain a substantially constant tension on the cable/hose, for example, to prevent the cable/hose from being tangled on any structure in the moon pool area as the drillship moves with wave motions. In one embodiment, an operator may activate a tensioning mode of operation as follows. First, the operator may select the "reel-in" interface control 302 and may set an appropriate speed with control 306 and 308. Next, the operator selects the "pressure tensioning mode" control 316 and selects an appropriate pressure, such as between about 10 PSI (nominally, about 70 kPa) and about 145 PSI (nominally, about 1000 kPa), preferably between about 15 PSI (nominally, about 100 kPa) and about 75 PSI (nominally, about 520 kPa), even more preferably between about 25 PSI (nominally, about 170 kPa) and about 50 PSI (nominally, about 345 kPa), and in one embodiment about 30-40 PSI (nominally, about 200-275 kPa). As the BOP stack is deployed (via its own controls and/or gravity) the line tension changes because, for example, the relative positions of the BOP stack and the rig may have changed due to water movement. In response, the system may either wind in the cable/hose (as the reel is set to "reel-in") or allows slippage (via regulator 72 shown in FIG. 6) as necessary to maintain the selected tension. In addition, because the operator is able to read the line tension 344 as measured by a sensor on the turn down sheave (described below in FIG. 8), the operator may be able to adjust the tension by selecting the appropriate controls 318 and 320 to fine tune the operation of the system.

In some embodiments, selection of a user interface control 302-330 may cause a series of operations to be performed. For example, selection of the "pressure tensioning mode" control 316 may select a "tensioning" mode to be activated and may also cause the drive motor 100 to rotate to wind in the cable or hose. Other combinations of operations may also be triggered by selection of a single interface control 302-330.

An operator may toggle control of the system between a local control unit 300 and a remote control unit 400 (described below with reference to FIG. 7) by selecting either the "local reel control" interface control 322 or the "remote reel control" 324.

Referring again to FIGS. 2-4, the electro-pneumatic drive system 200 may receive control signals from the local control unit 300 (and/or the remote control unit 400 described below) and, in response, may power the reel motor 100 to wind the cable on the spool 60 and run the level wind 64, among other features described above.

Figure 6:
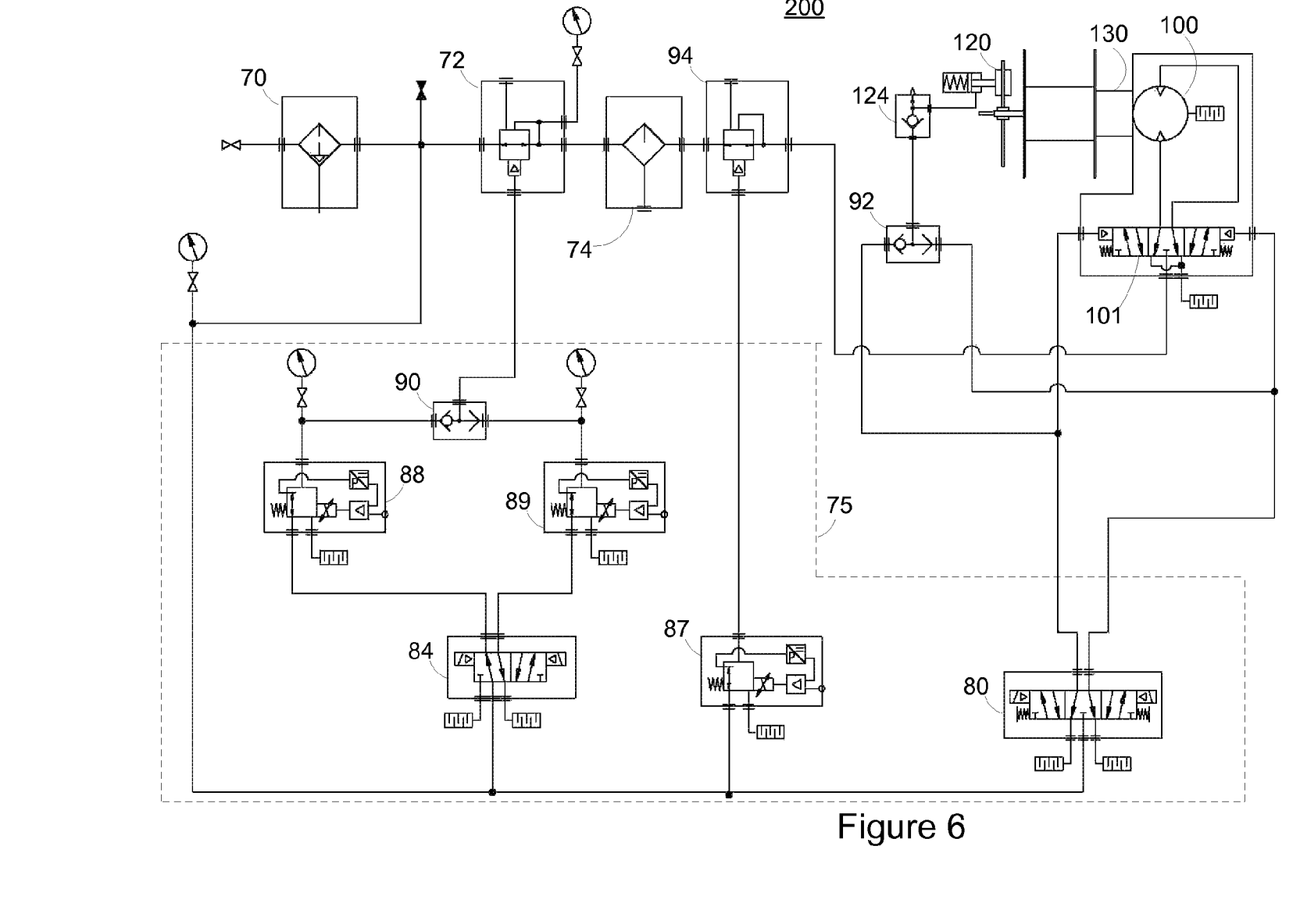
FIG. 6 shows a schematic diagram illustrating the operation of an exemplary electro-pneumatic drive system for use in an electronic control system for a cable/hose spooling system.

FIG. 6 shows a schematic diagram of one embodiment of an electro-pneumatic drive system 200. In one embodiment, this system 200 comprises a pneumatic air supply that may supply 340 standard cubic feet per minute (SCFM) up to about 145 PSI (nominally, about 1000 kPa), and typical up to about 120 PSI (nominally, about 830 kPa). Other volumetric flow rates and pressure values may be used. In the illustrated embodiment, the air supply may be connected to the electro-pneumatic drive unit 200 through an air filter 70, air regulator 72 and air lubricator 74, which may comprise Norgren models F17-800 A3DA, R24-801-RGNA, and L17-800-MPDA, respectively. A control panel 75 includes solenoid valves 80 and 84 and proportional pressure control valves 87, 88 and 89. The solenoid valve 80 may be provided for controlling the reel direction (i.e. "reel in" and "reel out") and may comprise a Versa series VGG-4304-316-XMFA. A similar solenoid valve 84 may be provided for selecting system pressure and mode of operation may comprise a Versa series VGG-4302-316-XMFA. The proportional pressure control valve 87, which may be of the type Norgen VP5010PK411H00, may feed the air regulator 94 for speed regulation. An output of the air filter 70 may be connected with the same line to solenoid valves 80 and 84 and proportional pressure control valve 87.

The outlets of the solenoid valve 84 feed pilot inputs to proportional pressure valves 88 and 89, thereby allowing an operator to select between a "normal" pressure mode and a "tensioning" pressure mode as described in more detail below. The output of these valves 88 and 89 are variable as a function the pilot input and fed to the air regulator 72 via a shuttle valve 90. The proportional pressure valves 88 and 89 may be of the type Norgren VP5010K411H00, while the valve 90 may be a Versa SV-3-316.

The air motor 100 receives an air supply from an air valve 101, which in turn is supplied by the air relay valve 94 and has pilot inputs from the solenoid valve 80. The valve 101, an integral part of air motor 100, has two outputs, each of which feeds one side of the air motor 100, in order to drive the air motor, and therefore the spool, in both directions. For the larger diameter valve 101, as well as for air motor 100, which drives the spool 60, the silencers may be of the type Allied Witan #0383007, or #0383010.

The air motor 100 may drive the spool through a planetary reducer 130. The planetary reducer may be of the type Brevini #PWD3200/SF/144/00/R33.

A disc brake caliper 120 for the motor 100 braking system may be interconnected to the air control system by way of shuttle valve 92 and a quick exhaust valve 124, which may be of the type Versa #QE-3-316. The brake caliper 120 may be configured like a typical air brake, i.e. held in the applied position by spring pressure (not show) and air pressure is used to release the brake from engagement. In the illustrated embodiment, the air motor 100 is a radial piston motor, such as the Fenner SPX #R33-X-XX-R1.

Appropriate ball valves, needle valves, air exhaust silencers and pressure gauges, as indicated schematically, may be interposed in the various interconnecting lines in the diagram of FIG. 6.

Referring again to FIGS. 2-4, an electrical interface 350 may be provided for attaching one or more remote control units 400. In one embodiment, the electrical interface 350 may be a multi-pin electrical connector such as an Amphenol Industrial Star-Line® series "ZP/ZR" connector or the like. In other embodiments, the remote-control may be coupled to the electro-pneumatic drive system 200 via a wireless interface, such as wireless local area network (WLAN) adaptor that comports to the Institute of Electrical and Electronics Engineers' (IEEE) 802.11 standards. Alternatively or additionally, other wireless communication interfaces, such as Bluetooth or ZigBee interfaces, may be provided.

Figure 7:
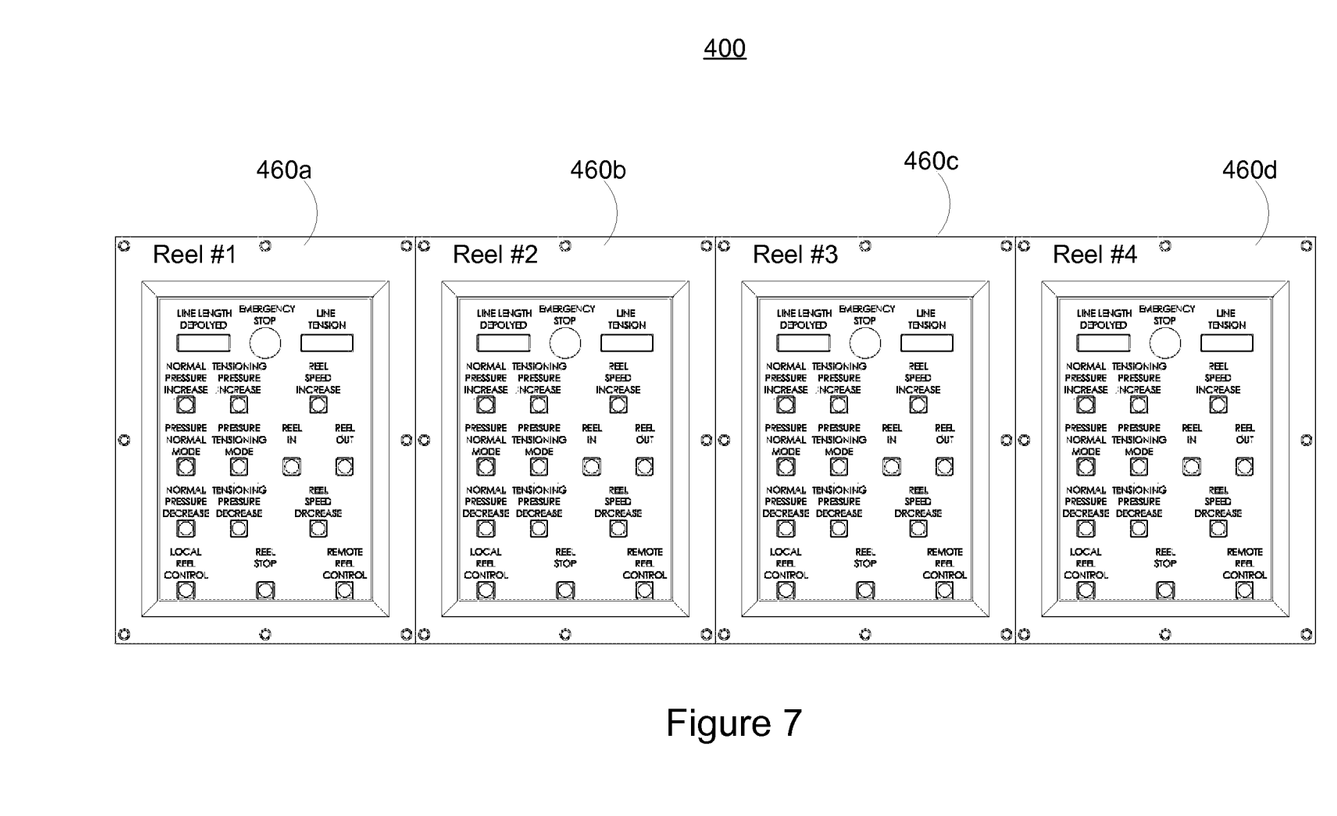
FIG. 7 shows an exemplary remote control panel for the configuration of cable reel assemblies shown in FIG. 1.

Referring to FIG. 7, an exemplary remote control unit 400 is shown. The remote control unit 400 may be substantially similar to the local control unit 300 shown in FIG. 5. For example, each of the user interface controls 302-330 and/or display controls 344 of the local control unit 300 may be mirrored on the remote control unit 400 (controls 402-430) and may operate as described above for the local control unit 300. The remote control unit 400 may connect with the electro-pneumatic control system 200 of FIG. 6 by way of an electrical interface 350, which essentially parallels the outputs of the local control unit 300.

In the illustrated embodiment, the remote control unit 400 may include a separate panel 460 for each reel assembly 10 coupled to the remote control unit 400. In some embodiments, the panels 460a-d may be color coded to indicate its corresponding reel assembly 10. Alternatively, or additionally, other indicia, such as text labels, may be used to indicate the associated reel assembly 10.

Selection of an interface control on either the local control unit 300 or the remote control unit 400 may cause indicia indicating the selection of the control and/or the currently selected mode of operation on the other control unit 300 and 400. For example, selection of the "reel-in" control 302 on the local control unit 300 of a reel assembly 10 may cause indicia indicating that the reel is currently winding the cable or hose, just as if the operator had selected the "reel-in" control 402 on the remote control stand. Notably, an operator may toggle control to the remote control unit 400 by selecting the "remote reel control" interface control 402 for a given reel assembly 10. In response, indicia will be displayed on the local control unit 300 to indicate that the remote control unit 400 currently has control of the reel assembly 10.

Figure 8:
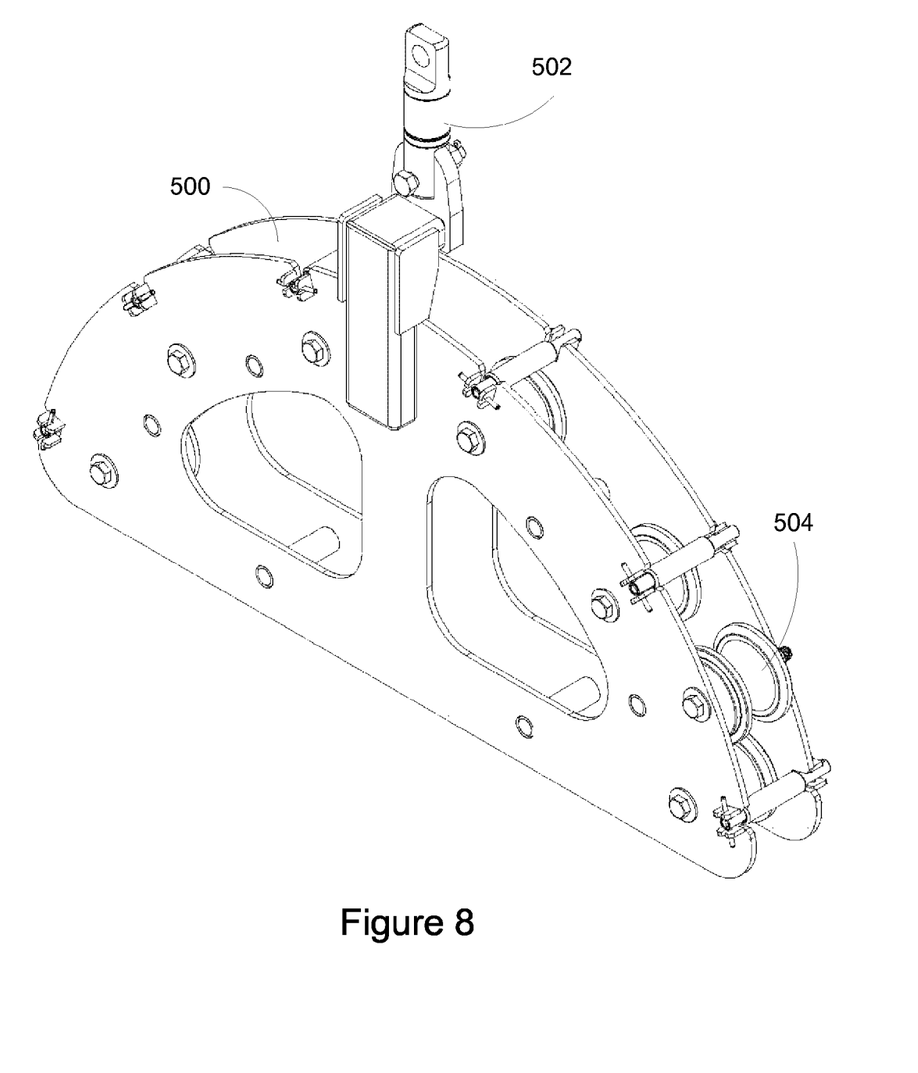
FIG. 8 shows an exemplary turn down sheave for use with a cable/hose reel assembly shown in FIG. 2.
Figure 9:
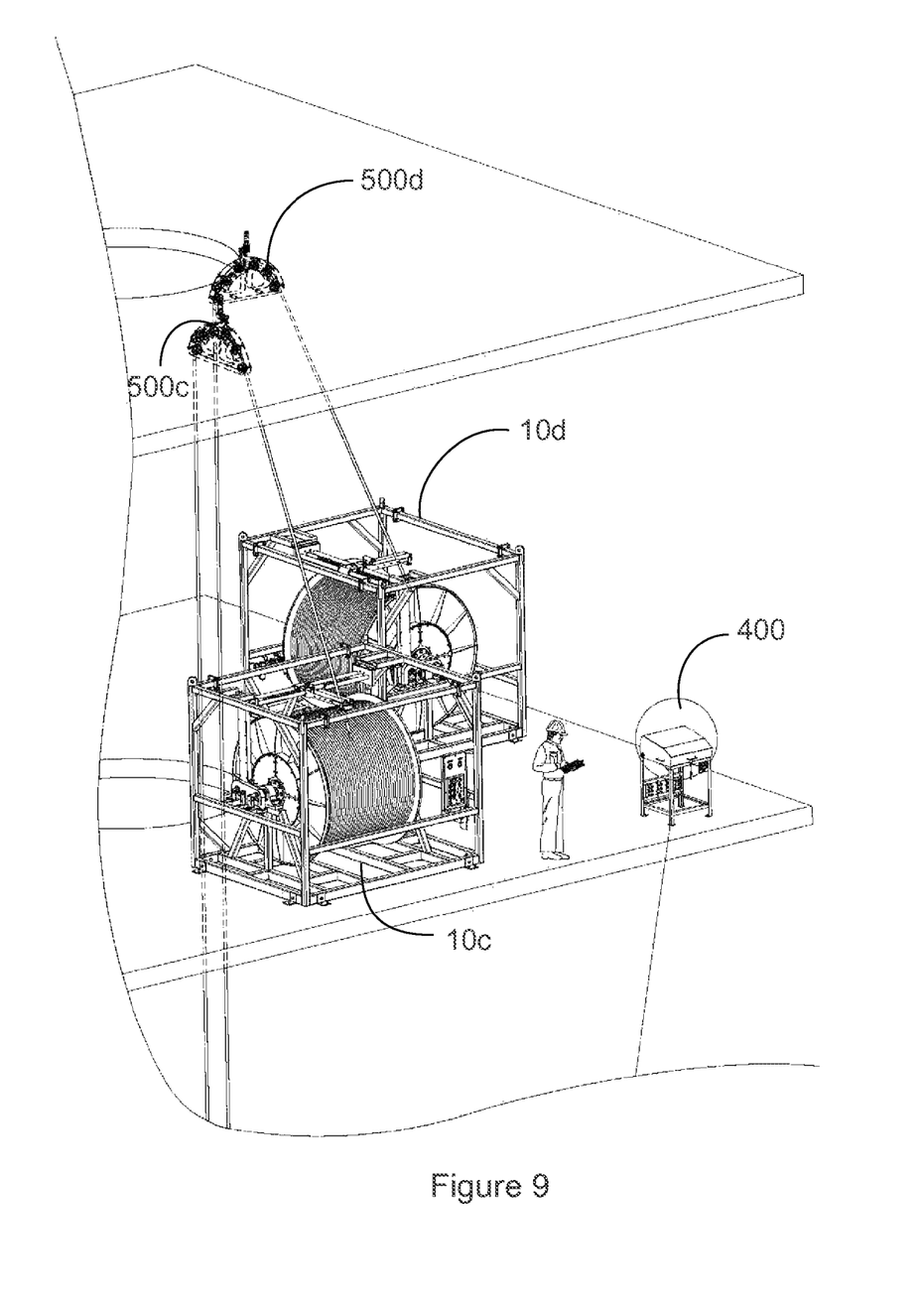
FIG. 9 shows an enlarged view of a portion of FIG. 1.

Referring to FIG. 8, an exemplary turn down sheave 500 for use in a reel assembly having one or more electronic control units 300 and 400 is shown. The sheave 500 may include a load cell 502 or other sensor that measures a force applied at the sheave 500 relating to the cable/hose tension. Alternatively, or additionally, the sheave 500 may include a position sensor 504 (such as a rotary encoder, reed sensor or the like) that measures the length of cable/hose that has been deployed (i.e. fed out to the BOP stack). In one embodiment, the sheave 500 may transmit these measurements to the electro-pneumatic drive 200, which in turn transmits that information to the local control unit 300, the remote control unit 400, or both. Alternatively, or additionally, the sheave 500 may be directly coupled to the local control unit 300, the remote control unit 400, or both. In either case, the information received from the sensors 502 and 504 on the sheave may be directly displayed on the control unit 300, such as at interface controls 344 and 346, or may be mathematically manipulated, reformatted, or the like in order to be displayed on the control unit 300.

Unlike purely pneumatic systems that suffer performance inherent limitations such as degradation over long distances, use of the local and remote electronic control units 300 and 400 in cooperation with an electro-pneumatic drive unit 200 as described herein virtually eliminates any loss in system response time and enables a reel operator to control the system 10 from any location on the drilling rig. Alternatively, or additionally, the systems and methods described herein also may enable a "driller's console" to be established where the BOP stack deployment may be observed via a series of cameras and the operator may manipulate the system via a remote electronic control unit 400 and even select control of a particular reel assembly 10 directly from the remote stand.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. A reel assembly for accepting, holding, and deploying cable, hose or umbilical connections, comprising:
   a spool assembly including a frame and a drum mounted in said frame, the drum including a core and end flanges for storing said cable, hose or umbilical connection;
   an air motor;
   a sheave coupled to one or more sensors;
   an electro-pneumatic drive unit including a plurality of pneumatic valves, electro-pneumatic valves, or both, the air motor coupled to the drum via the electro-pneumatic drive unit; and
   an electronic control unit coupled to the electro-pneumatic drive unit and the one or more sensors, where the electronic control unit receives user input and transmits electrical signals to the electro-pneumatic drive unit to cause the electro-pneumatic drive unit to control the motor to rotate the drum.

2. The reel assembly of claim 1, where the electronic control unit includes a touchscreen.

3. The reel assembly of claim 1, where the electronic control unit is fixedly attached to the frame.

4. The reel assembly of claim 1, where the electronic control unit displays status information.

5. The reel assembly of claim 4, where one or more sensors determine either at least one of a force applied to the sheave, a length of cable, hose or umbilical connection deployed, or both, where the electronic control unit receives, from the one or more sensors, information indicative of either the determined force, the length of cable, hose or umbilical connection deployed, or both, and where the displays either a line tension value, a deployed cable, hose or umbilical connection value, or both, based on the received information.

6. The reel assembly of claim 1, where the electronic control unit receives input and transmits electrical signals to the electro-pneumatic drive unit to cause the electro-pneumatic drive unit to increase or decrease an air pressure associated with the assembly.

7. The reel assembly of claim 1, where the each of the one or more sensors is one selected from the group comprising a load cell and a position sensor.

8. The reel assembly of claim 1, further comprising a second electronic control unit physically separate from the frame and an electrical interface that couples the second electronic control unit to the electro-pneumatic drive unit.

9. The reel assembly of claim 1, further comprising a pneumatic pressure gauge for displaying a pneumatic pressure.

10. The reel assembly of claim 1, where the electrical interface comprises a multi-pin electrical connector.

11. A reel assembly for accepting, holding, and deploying cable, hose or umbilical connections, comprising:
    a spool assembly including a frame and a drum mounted in said frame, the drum including a core and end flanges for storing said cable, hose or umbilical connection;
    an air motor;
    a sheave coupled to one or more sensors that determine either a force applied to the sheave, a length of cable, hose or umbilical connection deployed, or both;

an electro-pneumatic drive unit including a plurality of pneumatic valves, electro-pneumatic valves, or both, the air motor coupled to the drum via the electro-pneumatic drive unit;

a local electronic control unit coupled to the electro-pneumatic drive unit and the one or more sensors, where the local electronic control unit receives user input and transmits electrical signals to the electro-pneumatic drive unit to cause the electro-pneumatic drive unit to control the motor to rotate the drum; and a remote electronic control unit coupled to the electro-pneumatic drive unit and the one or more sensors, where the remote electronic control unit receives user input and transmits electrical signals to the electro-pneumatic drive unit to cause the electro-pneumatic drive unit to control the motor to rotate the drum.

12. The reel assembly of claim 11, where the local electronic control unit displays indicia indicative of at least one selected from the group of a user selection of an interface control and a current mode of operation.

13. The reel assembly of claim 12, where selection of a user interface control on the remote electronic control unit causes the local electronic control unit to display indicia indicative of at least one selected from the group of the user's selection on the remote electronic control unit user interface control and a current mode of operation.

14. The reel assembly of claim 11, where the remote electronic control unit displays indicia indicative of at least one selected from the group of a user selection of an interface control and a current mode of operation.

15. The reel assembly of claim 14, where selection of a user interface control on the local electronic control unit causes the remote electronic control unit to display indicia indicative of at least one selected from the group of the user's selection on the local electronic control unit user interface control and a current mode of operation.

16. A system for deploying a blow out prevention (BOP) stack, the system comprising:

a plurality of reel assemblies for accepting, holding, and deploying cable, hose or umbilical connections or the like, each assembly comprising:

a spool assembly including a frame and a drum mounted in said frame, the drum including a core and end flanges for storing said cable, hose or umbilical connection, an air motor, a sheave coupled to one or more sensors that determine either a force applied to the sheave, a length of cable, hose or umbilical connection deployed, or both;

an electro-pneumatic drive unit including a plurality of pneumatic valves, electro-pneumatic valves, or both, the air motor coupled to the drum via the electro-pneumatic drive unit, and a local electronic control unit coupled to the electro-pneumatic drive unit and the one or more sensors, where the local electronic control unit receives user input and transmits electrical signals to the electro-pneumatic drive unit to cause the electro-pneumatic drive unit to control the motor to rotate the drum; and a remote electronic control unit coupled to the electro-pneumatic drive unit of each of the plurality of reel assemblies and the one or more sensors of each of the plurality of reel assemblies, where the remote electronic control provides user interface controls for controlling each of the plurality of reel assemblies, receives user input for controlling a selected reel assembly and, in response, transmits electrical signals to the electro-pneumatic drive units of the selected reel assembly to cause the electro-pneumatic drive unit of the selected reel assembly to control the motor of the selected reel assembly to rotate the drum of the selected reel assembly.

17. The system of claim 16, where each reel assembly further comprises a brake assembly coupled to the drum and the electro-pneumatic drive unit, where the corresponding electronic control unit receives input and transmits electrical signals to the electro-pneumatic drive unit to cause the electro-pneumatic drive unit to rotate and de-activate the brake and where the remote electronic control unit receives input and transmits electrical signals to the electro-pneumatic drive unit to cause the electro-pneumatic drive unit to rotate and de-activate the brake.

18. The system of claim 16, where selection of a user interface control on any of the local electronic control unit causes the remote electronic control unit to display indicia indicative of at least one selected from the group of the user's selection on the local electronic control unit user interface control and a current mode of operation.

19. The system of claim 16, where the remote electronic control unit includes indicia indicating which of its user interface controls correspond to each of the reel assemblies.

20. The system of claim 19, where the indicia includes a color.

* * * * *